(12) United States Patent
Uchida et al.

(10) Patent No.: US 6,296,102 B1
(45) Date of Patent: Oct. 2, 2001

(54) CONTAINER REJECTING APPARATUS

(75) Inventors: Tadatsune Uchida; Kiyoharu Nakajima, both of Yokohama (JP)

(73) Assignee: Kirin Techno-System Corporation, Yokohama (JP)

( * ) Notice: Subject to any disclaimer, the term of this patent is extended or adjusted under 35 U.S.C. 154(b) by 0 days.

(21) Appl. No.: 09/315,160

(22) Filed: May 20, 1999

(30) Foreign Application Priority Data

| May 21, 1998 | (JP) | 10-156624 |
| Nov. 20, 1998 | (JP) | 10-331129 |
| Apr. 28, 1999 | (JP) | 11-122423 |

(51) Int. Cl.⁷ .................................................. B65G 47/46
(52) U.S. Cl. .............. 198/370.07; 198/597; 198/468.11; 198/749; 198/747
(58) Field of Search ............................ 198/370.07, 597, 198/468.11, 749, 747

(56) References Cited

U.S. PATENT DOCUMENTS

| 2,917,876 | * | 12/1959 | Clapp . | |
| 3,694,018 | * | 9/1972 | Levering | 293/121 |
| 3,729,084 | | 4/1973 | Stuart et al. . | |
| 3,739,882 | * | 6/1973 | Schwenk et al. | 188/268 |
| 4,073,117 | * | 2/1978 | Shenoha | 53/411 |
| 4,643,291 | * | 2/1987 | Counter et al. | 198/370.07 |
| 5,117,967 | * | 6/1992 | Morrow et al. | 198/495 |
| 5,135,101 | | 8/1992 | Dudley . | |
| 5,791,811 | * | 8/1998 | Yoshino | 404/6 |
| 5,944,169 | * | 8/1999 | Allen | 198/535 |

FOREIGN PATENT DOCUMENTS

| 36 23 327 | 1/1988 | (DE) . | |
| 44 41 196 | 11/1995 | (DE) . | |
| 0 708 266 | 4/1996 | (EP) . | |
| 360218224 | * 10/1985 | (JP) | B65G/47/68 |

* cited by examiner

Primary Examiner—Christopher P. Ellis
Assistant Examiner—Rashmi Sharma
(74) Attorney, Agent, or Firm—Oblon, Spivak, McClelland, Maier & Neustadt, P.C.

(57) ABSTRACT

A container rejecting apparatus is used for rejecting a container filled with a liquid such as beverage from a feed conveyor to a discharge conveyor adjacent thereto. The container rejecting apparatus has a pusher for pushing the container from the feed conveyor onto the discharge conveyor. The pusher has a front face comprising a plurality of tubes of synthetic resin.

8 Claims, 10 Drawing Sheets

F I G. 3A
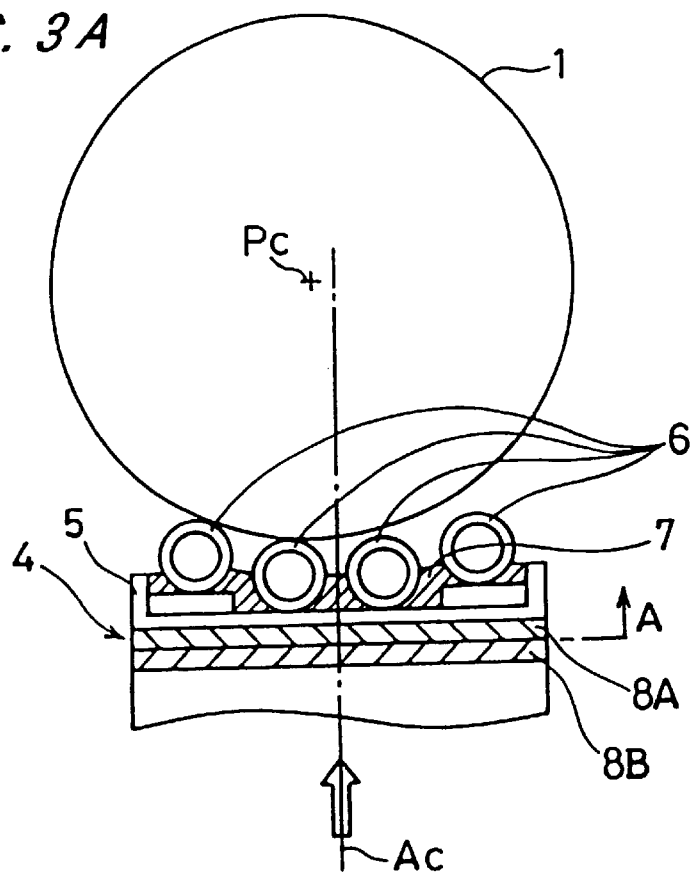
F I G. 3B
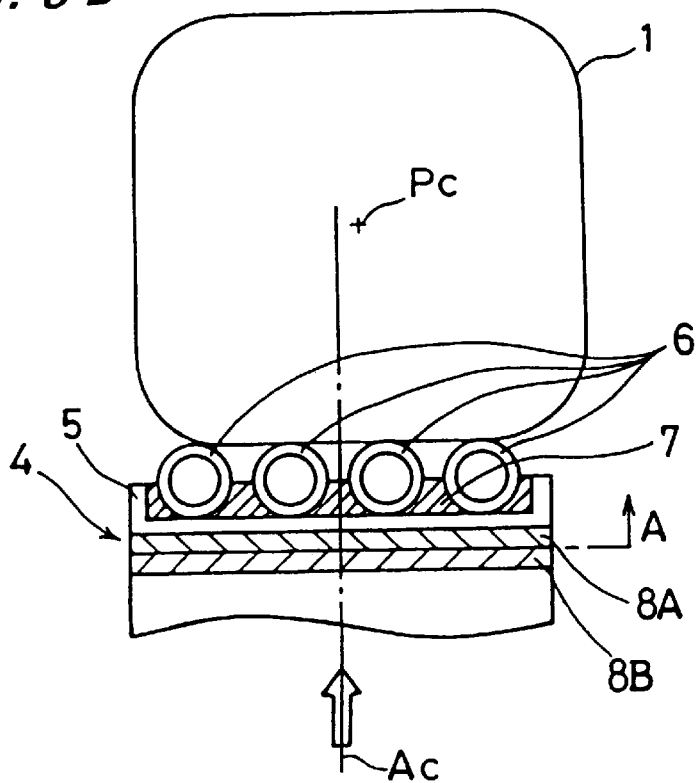

F I G. 5A
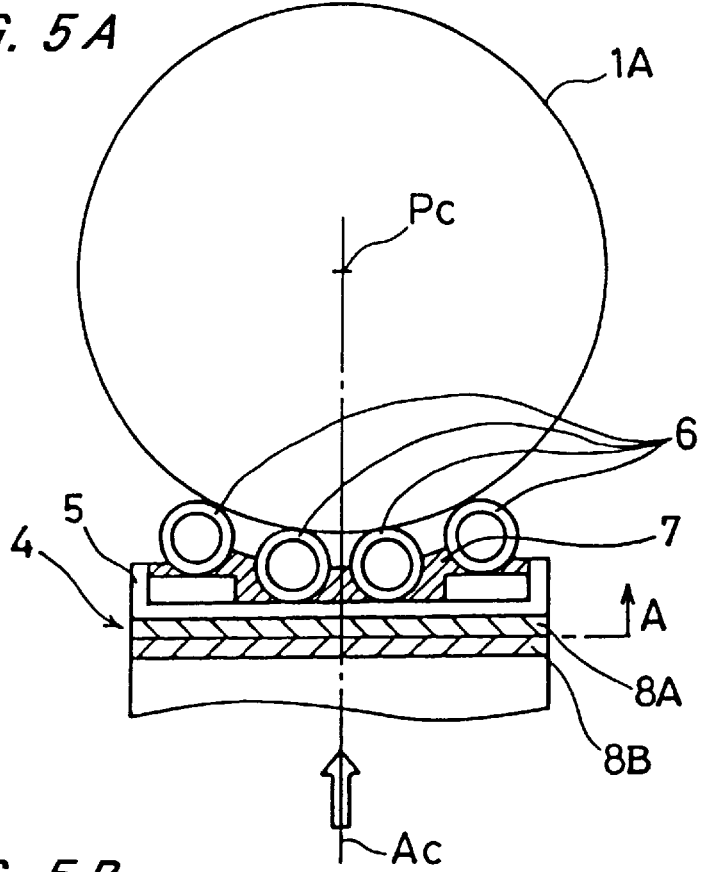
F I G. 5B
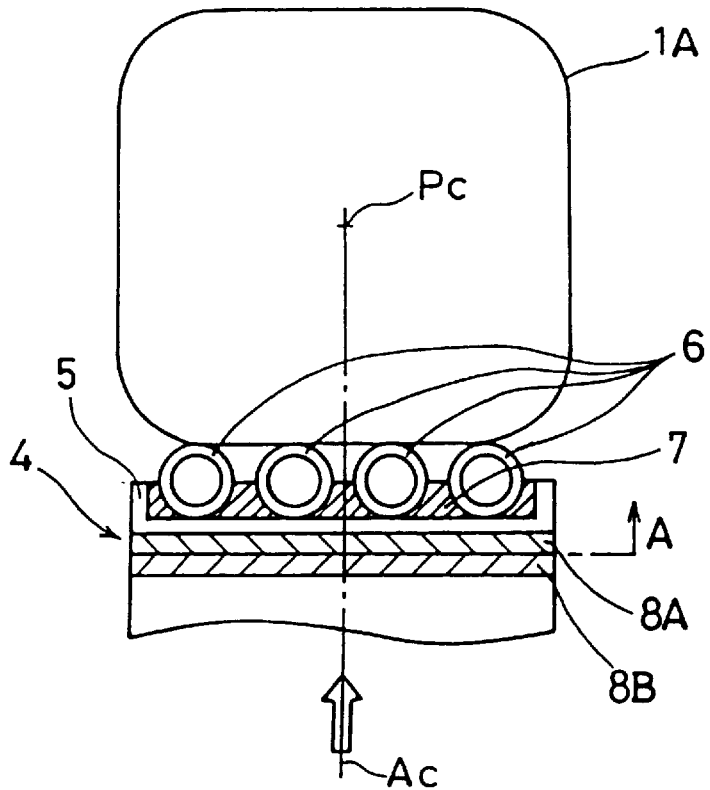

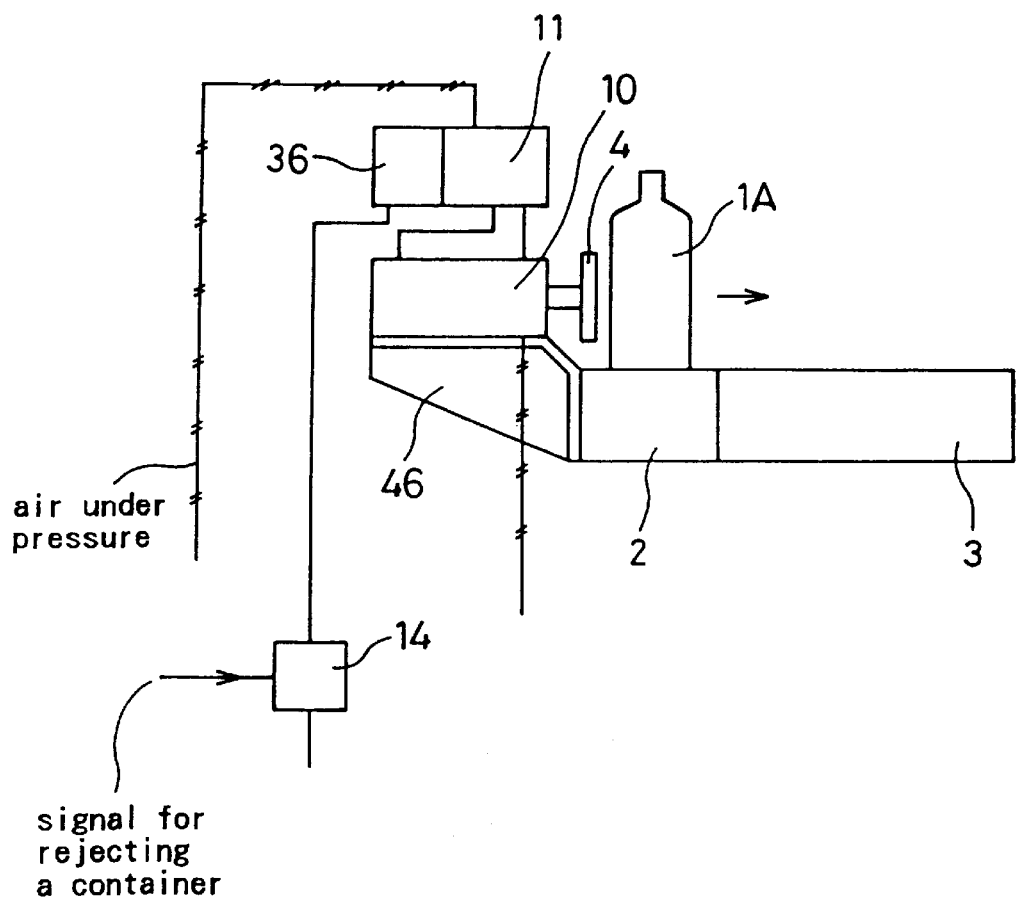

CONTAINER REJECTING APPARATUS

BACKGROUND OF THE INVENTION

1. Field of the Invention

The present invention relates to an apparatus for rejecting containers which are being delivered by a conveyor, and more particularly to a container rejecting apparatus suitable for use with containers filled with a liquid such as beverage.

2. Description of the Related Art

There has been known a container rejecting apparatus having a pusher for rejecting containers filled with a liquid from a feed conveyor onto a discharge conveyor positioned adjacent to the feed conveyor. Containers that can be rejected by the container rejecting apparatus include PET (polyethylene terephthalate) bottles, glass bottles, cans, etc. The pusher is moved in a short stroke by an air cylinder to accelerate and push a container off the feed conveyor. The pusher moves in the short stroke because the pusher should not hit a next container when it moves back and forth. A flat plate of rubber or synthetic resin is attached to a front face of the pusher.

The feed conveyor comprises chains of synthetic resin and upper plates of synthetic resin which are integrally formed with the chains. The feed conveyor and the discharge conveyor move at the same speed. A guard rail is obliquely disposed over the discharge conveyor for preventing a rejected container from moving off the discharge conveyor. A container which has been pushed of f by the pusher moves obliquely forward at a constant posture onto the discharge conveyor due to inertia and friction with the discharge conveyor, obliquely hits the guard rail, changes its direction, and is finally discharged by the discharge conveyor.

As described above, the containers include PET bottles, and the PET bottles include those having a circular barrel and those having a rectangular barrel. The PET bottle have their bottoms whose central positions are raised into the bottles. Bottoms of various types of PET bottles which contact the conveyor are shown in FIGS. 7A, 7B and 7C of the accompanying drawings. That is, FIGS. 7A, 7B and 7C show the bottoms of various types of PET bottles, with contact areas between the bottoms and the conveyor being shown hatched.

FIG. 7A shows a circular PET bottle 1 which has a circular ring-shaped contact area 1a. FIG. 7B shows a circular PET bottle 1 which has a petaloid pattern of five contact areas 1b. FIG. 7C shows a square PET bottle 1 which has a square ring-shaped contact area 1c. The square PET bottles are conveyed by the feed conveyor while their sides are being parallel or perpendicular to the direction of movement of the feed conveyor.

In the conventional container rejecting apparatus, the distance between the front face of the pusher which is held in a standby position and the container that arrives at the position of the pusher is minimized to reduce a shock which is produced when the pusher hits the container. However, the container tends to fluctuate, i.e. be unsteady in its posture when it starts being moved because the container is abruptly accelerated by the pusher. It has been desired to prevent the container from fluctuating in its posture when it is pushed by the pusher and starts being moved.

In PET bottles, recently, small-size PET bottles having a volume of 500 ml have been used, and bottle filling lines have been operated at a high speed. Although a low-speed bottle filling line causes no problem, a high-speed bottle filling line requires the pusher of the container rejecting apparatus to be operated at a high speed. Thus, the PET bottles pushed by the pusher tend to fluctuate in their posture on their forward movement and fall down by contact with the guard rail. Those PET bottles which have a square ring-shaped contact area between the bottom and the conveyor are most liable to fall down, and those PET bottles which have a petaloid pattern of contact areas between the bottom and the conveyor are also liable to fall down. Those PET bottles which have a circular ring-shaped contact area between the bottom and the conveyor may fluctuate, but are less liable to fall down. It has been desired to be able to reject containers in a high-speed bottle filling line while preventing them from falling down.

SUMMARY OF THE INVENTION

It is therefore an object of the present invention to provide a container rejecting apparatus having a pusher for rejecting a container off a feed conveyor without causing the container to fluctuate in its posture when the container is pushed by the pusher and starts being moved.

Another object of the present invention is to provide a container rejecting apparatus which is capable of rejecting a PET bottle filled with a liquid from a high-speed feed conveyor without causing the PET bottle to fall down.

According to a first aspect of the present invention, there is provided a container rejecting apparatus for rejecting a container filled with a liquid from a feed conveyor to a discharge conveyor adjacent thereto, comprising a pusher for pushing the container from the feed conveyor onto the discharge conveyor, the pusher having a front face comprising a plurality of tubes of synthetic resin.

According to the first aspect of the present invention, the tubes of synthetic resin are hollow and hence are flexible, and are not strongly repulsive. Therefore, the tubes absorb shocks when they hit the container. When the container starts being moved forward by the pusher, the container is accelerated smoothly, and does not fluctuate in its posture. As a result, the container is prevented from falling down.

According to a second aspect of the present invention, there is provided a container rejecting apparatus for rejecting a container filled with a liquid from a feed conveyor to a discharge conveyor adjacent thereto, the container comprising a PET bottle, the apparatus comprising a pusher for pushing the PET bottle from the feed conveyor onto the discharge conveyor, the pusher being positioned to impart an angular movement to the PET bottle when pushing the PET bottle.

According to a third aspect of the present invention, there is provided a container rejecting apparatus for rejecting a container filled with a liquid from a feed conveyor to a discharge conveyor adjacent thereto, said container comprising a PET bottle, the apparatus comprising a pusher for pushing the PET bottle from the feed conveyor onto the discharge conveyor, the pusher and the PET bottle being held out of alignment with each other when the pusher contacts the PET bottle.

According to the second aspect of the present invention, the pusher imparts an angular movement to the PET bottle when pushing the PET bottle. According to the third aspect of the present invention, the pusher and the PET bottle are held out of alignment with each other when the pusher contacts the PET bottle. In the second and third aspects, therefore, the PET bottle which is pushed by the pusher moves forward and rotates at the same time, and hence the PET bottle is transferred smoothly from the feed conveyor onto the discharge conveyor. Since the PET bottle rotates, the bottom of the PET bottle slides well on the conveyors while being moved forward, and the PET bottle is less liable to fluctuate in its posture.

According to a fourth aspect of the present invention, there is provided a container rejecting apparatus for rejecting a container filled with a liquid from a feed conveyor to a discharge conveyor adjacent thereto, comprising: a pusher for pushing the container from the feed conveyor onto the discharge conveyor; an air cylinder having a piston reciprocable within the air cylinder between an advanced position and a retracted position, and a piston rod connected to the piston, the pusher being fixed to the piston rod; a solenoid valve assembly having a solenoid for driving a spool, one port connected to a pressurized air source, two ports connected to the air cylinder, and one port for exhausting air from the air cylinder; wherein air under pressure is constantly supplied to the side pushing the piston toward its retracted position without passing through the solenoid valve assembly, and air under pressure is supplied through the solenoid valve assembly to the side pushing the piston to its advanced position and is exhausted from the side pushing the piston to its retracted position when the solenoid is energized, and air under pressure is exhausted from the side pushing the piston to its advanced position and the exhaustion of air from the side pushing the piston to its retracted position is halted when the solenoid is de-energized.

According to the fourth aspect of the present invention, when the solenoid valve assembly is electrically energized, pressurized air is supplied to the side pushing the piston toward its extended position and exhausted from the side returning the piston to its retracted position. Accordingly, the pusher connected to the piston is moved forward to push a container off the conveyor. When the solenoid valve assembly is de-energized, air is exhausted from the side pushing the piston toward its extended position, while the exhaustion of air from the side returning the piston to its retracted position is halted. Accordingly, the pusher fixed to the piston returns quickly to its original position.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 3A is a cross-sectional view of a forward end of a pusher for use with the circular containers shown in FIG. 1A;

FIG. 3B is a cross-sectional view of a forward end of a pusher for use with the square containers shown in FIG. 1B;

FIG. 5A is a cross-sectional view of a forward end of a pusher of a container rejecting apparatus according to a second embodiment of the present invention, for use with circular containers such as large-size PET bottles or glass bottles;

FIG. 5B is a cross-sectional view of a forward end of a pusher of the container rejecting apparatus according to the second embodiment of the present invention, for use with square containers;

FIG. 8 is a side view showing the basic structure of a container rejecting apparatus according to a third embodiment of the present invention;

DETAILED DESCRIPTION OF THE PREFERRED EMBODIMENTS

A container rejecting apparatus according to a first embodiment of the present invention will be described below with reference to FIGS. 1A and 1B through 4. According to the first embodiment, containers handled by the container rejecting apparatus are PET bottles.

Figure 1A:
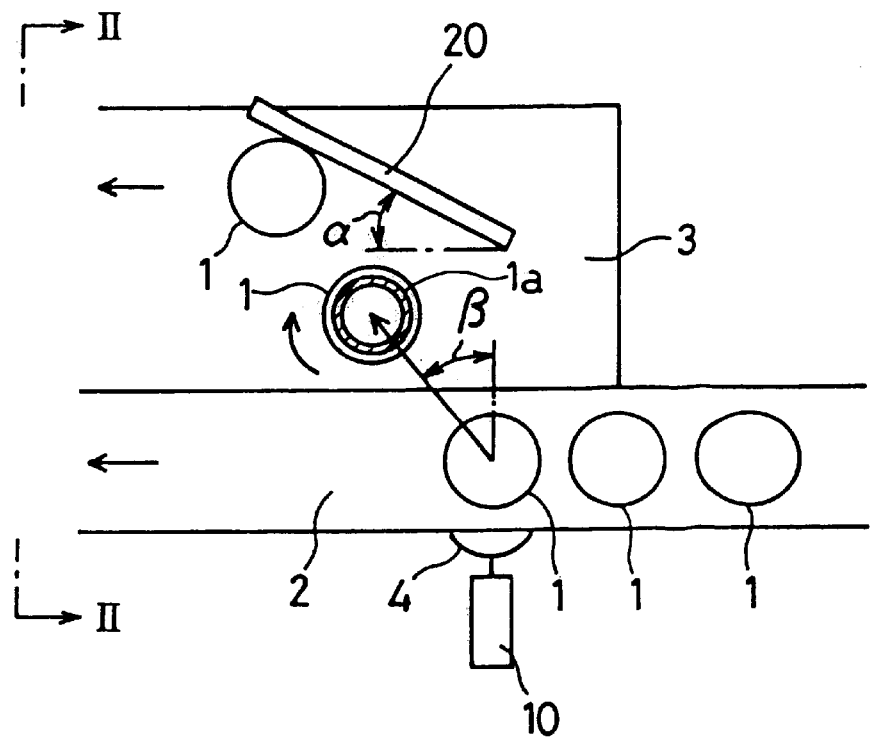
FIG. 1A is a plan view of a container rejecting apparatus which handles circular containers according to a first embodiment of the present invention.
Figure 1B:
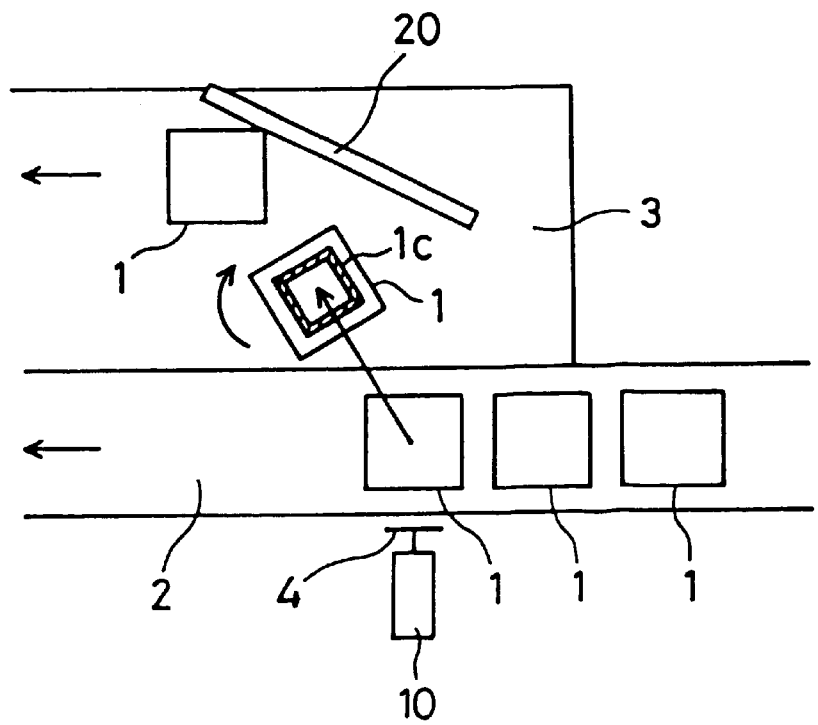
FIG. 1B is a plan view of the container rejecting apparatus which handles square containers according to the first embodiment of the present invention.

FIGS. 1A and 1B illustrate basic structures of the container rejecting apparatus according to the first embodiment of the present invention. FIG. 1A shows the container rejecting apparatus which handles circular PET bottles, and FIG. 1B shows the container rejecting apparatus which handles square PET bottles.

As shown in FIGS. 1A and 1B, a plurality of PET bottles 1 filled with a liquid are fed in an upstanding posture by a feed conveyor 2. A discharge conveyor 3 is disposed parallel and adjacent to the feed conveyor 2. The feed conveyor 2 and the discharge conveyor 3 operate at the same speed in the same direction.

The container rejecting apparatus includes a pusher 4 disposed near the feed conveyor 2 on a side thereof remote from the discharge conveyor 3. The pusher 4 serves to reject a PET bottle 1 transversely from the feed conveyor 2 onto the discharge conveyor 3. The pusher 4 performs a reciprocating motion by an air cylinder 10 in a relatively short stroke. The container rejecting apparatus also has a guard rail 20 mounted over the discharge conveyor 3 obliquely to the discharge conveyor 3.

Figure 2:
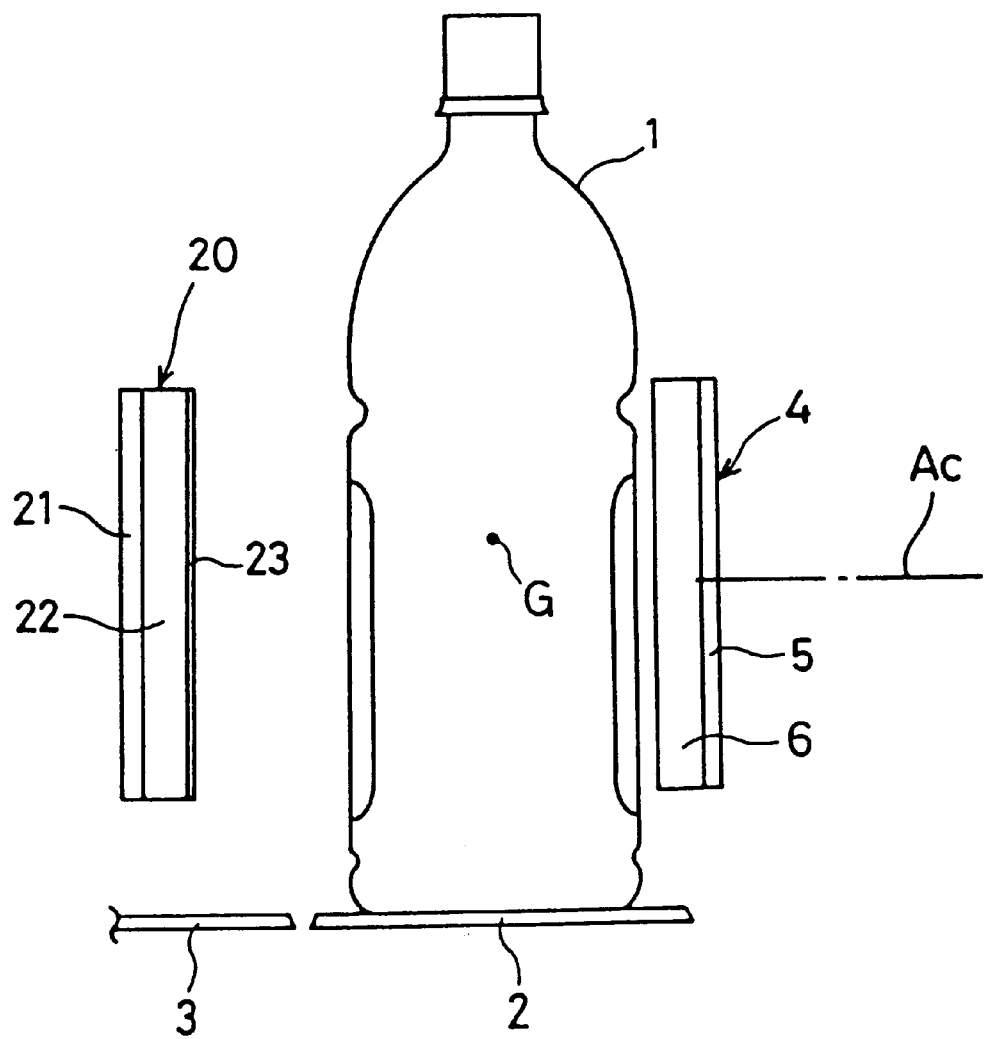
FIG. 2 is an elevational view taken along line II—II of FIG. 1A.

FIG. 2 shows a small-size PET bottle having a volume of 500 ml as the PET bottle 1. As shown in FIG. 2, the pusher 4 has a support plate 5 on its forward end and a plurality of vertical silicone tubes 6 fixed to a surface of the support plate 5 which faces the PET bottle 1. The air cylinder 10 has a horizontal central axis Ac positioned slightly lower than the center of gravity G of the PET bottle 1. The guard rail 20 comprises a support plate 21, an expanded sponge layer 22 mounted on a surface of the support plate 21 which faces the PET bottle 1, and a fluoroplastic sheet 23 attached to a surface of the expanded sponge layer 22 which faces the PET bottle 1. The expanded sponge layer 22 has a thickness of 10 mm.

FIGS. 3A and 3B show forward ends of pushers 4 which are of basically the same design, but are shaped to handle differently shaped PET bottles 1. Specifically, FIG. 3A illustrates a pusher 4 for handling circular PET bottles having a volume of 500 ml shown in FIG. 1A, and FIG. 3B illustrates a pusher 4 for handling square PET bottles having a volume of 500 ml shown in FIG. 1B. The pushers 4 shown in FIGS. 3A and 3B differ from each other in that the pusher 4 shown in FIG. 3A has an arcuate bottle contact face and the pusher 4 shown in FIG. 3B has a flat bottle contact face. As shown in FIGS. 3A and 3B, each of the pushers 4 has four vertical silicone tubes 6 fixed to a support plate 5 by an adhesive 7.

In FIG. 3A, the four silicone tubes 6 are arranged on the arcuate bottle contact face so as to contact an arcuate outer surface of the PET bottle 1 substantially equally when the center of the PET bottle 1 and the center of the pusher 4 are aligned with each other. In FIG. 3B, the four silicone tubes 6 are arranged on the flat bottle contact face so as to contact a flat outer surface of the PET bottle 1 substantially equally when the center of the PET bottle 1 and the center of the pusher 4 are aligned with each other. Each of the silicone tubes 6 comprises a tube of extruded silicone rubber incorporating braided glass fibers therein, and has an inside diameter of 8 mm and a length of about 100 mm. Adjacent ones of the silicone tubes 6 are spaced from each other by a predetermined gap such that the individual silicone tubes 6 can be elastically deformed without mutual interference. The adhesive 7 comprises a soft adhesive so as not to interfere the elastic deformation of the silicone tubes 6.

In each of the pushers 4 shown in FIGS. 3A and 3B, the support plate 5 is held by a pair of removable tape fasteners 8A, 8B. When PET bottles 1 to be handled change from those of the circular cross-sectional shape to those of the square cross-sectional shape, the front portion of the pusher 4 shown in FIG. 3A which is indicated by the arrow A can be replaced with the front portion of the pusher 4 shown in FIG. 3B which is indicated by the arrow A. Conversely, when PET bottles 1 to be handled change from those of the square cross-sectional shape to those of the circular cross-sectional shape, the front portion of the pusher 4 shown in FIG. 3B which is indicated by the arrow A can be replaced with the front portion of the pusher 4 shown in FIG. 3A which is indicated by the arrow A.

When each of the pushers shown in FIGS. 3A and 3B moves forward into contact with the PET bottle 1, the pusher 4 and the PET bottle 1 are slightly out of alignment with each other, i.e., the center Pc of the PET bottle 1 is held out of alignment with the center Ac of the air cylinder 10.

Figure 4:
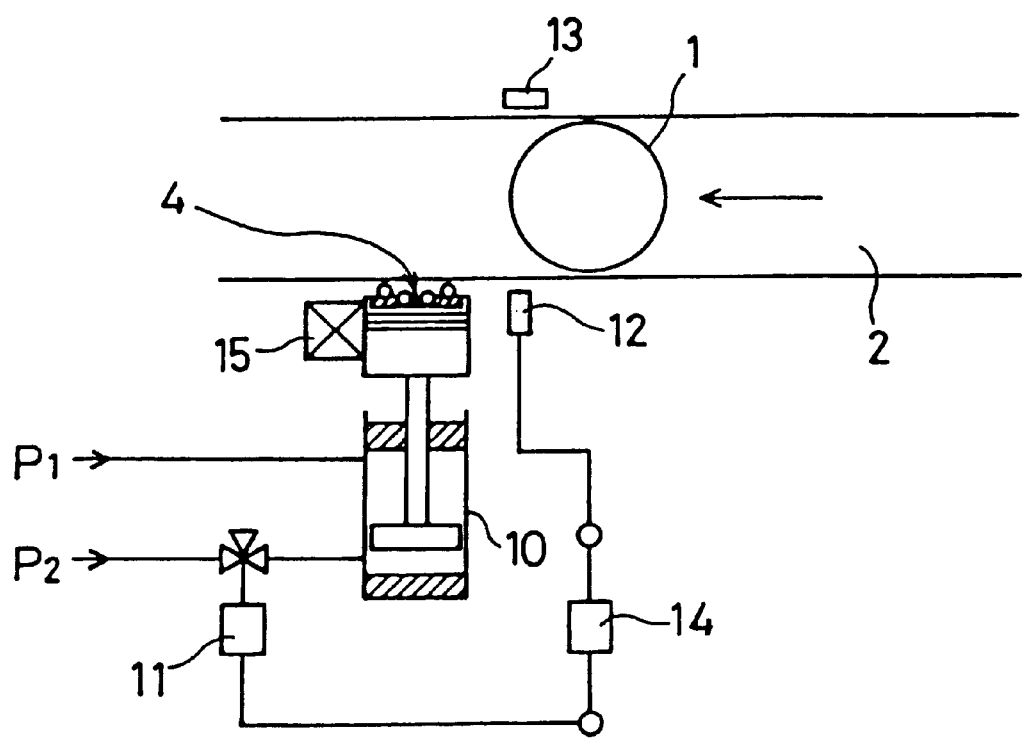
FIG. 4 is a schematic plan view of an adjusting mechanism for adjusting an off-center alignment between a pusher and a PET bottle.

FIG. 4 shows an adjusting mechanism for adjusting an off-center alignment between the pusher 4 and the PET bottle 1 so as to bring the pusher 4 into contact with the PET bottle 1 slightly out of alignment with each other. As shown in FIG. 4, the air cylinder 10 has two spaces therein, one of which is connected to a compressed air source having a pressure of P, and the other of which is connected to a compressed air source having a pressure of $P_2$ by a solenoid valve assembly 11. The air pressure $P_2$ is higher than the air pressure $P_1$.

A light emitting/receiving detector 12 is positioned on one side of the feed conveyor 2 upstream of the pusher 4 with respect to the direction in which PET bottles 1 are fed by the feed conveyor 2. A light reflector 13 is positioned on the other side of the feed conveyor 2 in alignment with the light emitting/receiving detector 12 across the feed conveyor 2. A signal issued by the light emitting/receiving detector 12 which detects the PET bottle 1 is supplied to a timer 14, which applies a signal to actuate the solenoid valve assembly 11. Specifically, when the PET bottle 1 is fed by the feed conveyor 2 to a position in front of the light emitting/receiving detector 12, a light beam emitted from the light emitting/receiving detector 12 and reflected by the light reflector 13 is interrupted by the PET bottle 1. The light emitting/receiving detector 12 then issues a detected signal to the timer 14, which starts measuring a preset time. When the preset time elapses, the timer 4 applies a signal to the solenoid valve assembly 11, which is then actuated to push the PET bottle 1 from the feed conveyor 2. The preset time of the timer 14 is selected such that the pusher 4 and the PET bottle 1 will be slightly out of alignment with each other as desired when the PET bottle 1 arrives at the position of the pusher 4. The pusher 4 is prevented from rotating by a rotation prevention member 15 disposed adjacent thereto.

As described above, when the pusher 4 moves forward into contact with the PET bottle 1, the pusher 4 and the PET bottle l are slightly out of alignment with each other. When the PET bottle 1 is pushed by the pusher 4 which is slightly out of alignment with the PET bottle 1, the PET bottle 1 is moved forward while rotating about its vertical axis, as shown in FIGS. 1A and 1B, and changes its direction when the PET bottle 1 hits the guard rail 20.

The PET bottle 1, regardless of whether it has a circular cross-sectional shape or a square cross-sectional shape, may rotate clockwise or counterclockwise. In FIGS. 1A and 1B, the PET bottle 1 is shown as rotating clockwise. Preferably, the PET bottle 1 of a square cross-sectional shape should rotate about one-fourth of its full one revolution, and the PET bottle 1 of a circular cross-sectional shape with a petaloid pattern of contact areas should rotate about one-half of its full one revolution. If the PET bottle 1 of a circular cross-sectional shape with a petaloid pattern of contact areas rotated a full one revolution, then the PET bottle 1 would fall down before hitting the guard rail 20. If the PET bottle 1 of a circular cross-sectional shape with a petaloid pattern of contact areas rotated about one-fourth of the full one revolution, then the PET bottle 1 would fall down upon hitting the guard rail 20 in the same manner as the conventional PET bottle which does not rotate.

The angular displacement of the PET bottle 1 is adjusted by the adjusting mechanism shown in FIG. 4 which adjusts an off-center alignment between the pusher 4 and the PET bottle 1 based on the preset time of the timer 14, as described above.

The off-center alignment between the pusher 4 and the circular PET bottle 1 with a circular ring-shaped contact area is set to the same as the off-center alignment between the pusher 4 and the circular PET bottle 1 with a petaloid pattern of contact areas, so that no adjustments will be necessary at site. As shown in FIG. 1A, the angle β, with respect to the axis perpendicular to the longitudinal axis of the feed conveyer 2, at which the PET bottle 1 is rejected from the feed conveyor 2 varies with the speeds at which the feed conveyor 2 and the pusher 4 move. The angle α of the guard rail 20 with respect to the longitudinal axis of the discharge conveyor 3 is adjusted so as to be optimal based on the angle β.

As described in connection with the conventional container rejecting apparatus, when PET bottles are fed at a high speed and do not rotate about their vertical axes, those PET bottles which have a square ring-shaped contact area between the bottom and the conveyor are most liable to fall down, those PET bottles which have a petaloid pattern of contact areas between the bottom and the conveyor are also liable to fall down, and those PET bottles which have a circular ring-shaped contact area between the bottom and the conveyor are less liable to fall down.

In contrast thereto, when PET bottles are fed at a high speed and rotate about their vertical axes, those PET bottles which have a square ring-shaped contact area are much less liable to fall down, those PET bottles which have a petaloid pattern of contact areas are less liable to fall down, and those PET bottles which have a circular ring-shaped contact area are less liable to fluctuate in its posture.

Figure 7A:
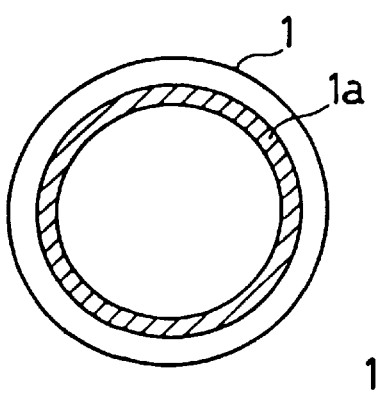
FIGS. 7A, 7B and 7C are bottom views showing bottoms of various types of PET bottles.
Figure 7B:
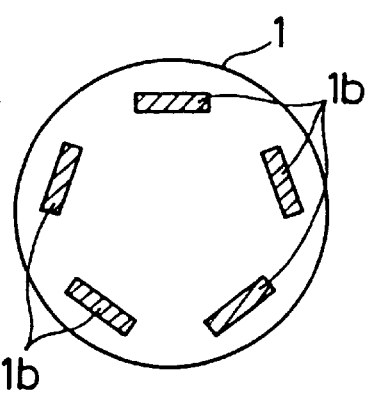
Figure 7C:
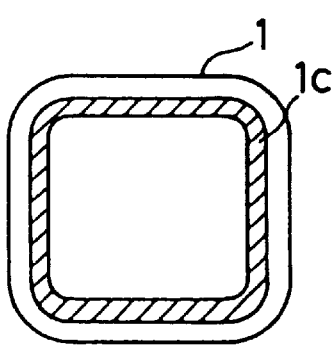

Based on the above analysis, it is presumed that when a PET bottle rotates about its vertical axis, the bottom of the PET bottle as it is pushed by the pusher slides well on the conveyor, and the PET bottle is less liable to fluctuate in its posture. It is also presumed that when a PET bottle having a square ring-shaped contact area $1c$ (see FIG. 7C) rotates about its vertical axis, as shown in FIG. 1B, four sides of the square ring-shaped contact area $1c$ are inclined to the direction in which the conveyor moves, resulting in a condition similar to that which is achieved by a PET bottle having a circular ring-shaped contact area $1a$ (see FIG. 7A). Thus, the PET bottle becomes much less liable to fall down. It is further presumed that a PET bottle having a petaloid pattern of five contact areas $1b$ (see FIG. 7B) behaves in the same manner as the PET bottle having a square ring-shaped contact area.

The PET bottle 1 may rotate clockwise or counterclockwise because its angular movement is important to prevent the PET bottle 1 from falling down. The square PET bottle 1 should rotate about one-fourth of its full one revolution because it regains its original posture when it is thus angularly moved. An experimental result confirmed the effectiveness of such angular movement. Another experimental result also confirmed that the circular PET bottle 1 with a petaloid pattern of contact areas should rotate about one-half of its full one revolution.

The container rejecting apparatus according to the first embodiment shown in FIGS. 1A and 1B through 4 is suitable for use with small-size PET bottles having a volume of 500 ml. When the pusher contacts such a small-size PET bottle, the pusher and the PET bottle are slightly out of alignment with each other. This is because the PET bottle rotates about its vertical axis when it is moved forward, allowing its bottom to slide well on the conveyor to thus make the PET bottle less liable to fluctuate in its posture.

The inventors of the present invention conducted experiments on various other containers than small-size PET bottles, such as large-size PET bottles, glass bottles or cans, and have found that only small-size PET bottles need to be held out of alignment with the pusher. Specifically, large-size PET bottles are conveyed in a low speed line though they do not slide well on the conveyor, and glass bottles and cans slide well on the conveyor though they are conveyed in a high speed line. Since large-size PET bottles, glass bottles, and cans are less liable to fluctuate in their posture while they are being moved forward, they are not required to rotate about their vertical axes.

However, it has been found that large-size PET bottles, glass bottles, and cans fluctuate in their posture when they start being moved forward by the pusher, although they fluctuate in their posture during a forward movement. In order to minimize fluctuations of those containers when they start being moved forward by the pusher, the inventors have made research efforts and conducted experiments. As a result, the inventors have found that the pushers 4 with the silicone tubes 6 on their front faces as shown in FIGS. 3A and 3B are highly effective to minimize fluctuations of those containers when they start being moved forward by the pusher.

FIGS. 5A and 5B show a container rejecting apparatus according to a second embodiment of the present invention. FIG. 5A shows a pusher 4 of the container rejecting apparatus for use with containers 1A of a circular cross-sectional shape such as large-size PET bottles or glass bottles, and FIG. 5B shows a pusher 4 of the container rejecting apparatus for use with containers 1A of a square cross-sectional shape. The pushers 4 shown in FIGS. 5A and 5B differ from each other in that the pusher 4 shown in FIG. 5A has an arcuate bottle contact face and the pusher 4 shown in FIG. 5B has a flat bottle contact face. As shown in FIGS. 5A and 5B, each of the pushers 4 has four vertical silicone tubes 6 fixed to a support plate 5 by an adhesive 7.

In FIG. 5A, the four silicone tubes 6 are arranged on the arcuate bottle contact face so as to contact an arcuate outer surface of the container 1A substantially equally when the container 1A and the pusher 4 are aligned with each other. In FIG. 5B, the four silicone tubes 6 are arranged on the flat bottle contact face so as to contact a flat outer surface of the container 1A substantially equally when the container 1A and the pusher 4 are aligned with each other. Each of the silicone tubes 6 comprises a tube of extruded silicone rubber incorporating braided glass fibers therein, and has an inside diameter of 8 mm and a length of about 100 mm. Adjacent ones of the silicone tubes 6 are spaced from each other by a predetermined gap such that the individual silicone tubes 6 can be elastically deformed without mutual interference. The adhesive 7 comprises a soft adhesive so as not to interfere the elastic deformation of the silicone tubes 6.

In each of the pushers 4 shown in FIGS. 5A and 5B, the support plate 5 is held by a pair of removable tape fasteners 8A, 8B. When containers 1A to be handled change from those of the circular cross-sectional shape to those of the square cross-sectional shape, the front portion of the pusher 4 shown in FIG. 5A which is indicated by the arrow A can be replaced with the front portion of the pusher 4 shown in FIG. 5B which is indicated by the arrow A. Conversely, when containers 1A to be handled change from those of the square cross-sectional shape to those of the circular cross-sectional shape, the front portion of the pusher 4 shown in FIG. 5B which is indicated by the arrow A can be replaced with the front portion of the pusher 4 shown in FIG. 5B which is indicated by the arrow A.

When each of the pushers 4 shown in FIGS. 5A and 5B moves forward into contact with the container 1A, the pusher 4 and the container 1A are not held out of alignment with each other, i.e., the center Pc of the container 1A is held in alignment with the center Ac of the air cylinder 10. The pushers 4 shown in FIGS. 5A and 5B are structurally identical to those shown in FIGS. 3A and 3B, and are actuated by the adjusting mechanism shown in FIG. 4. However, the preset time of the timer 14 is selected such that the pusher 4 and the container 1A will be held in alignment with each other when the container 1A arrives at the position of the pusher 4.

Since the pusher 4 and the container 1A are not held out of alignment with each other, i.e., the center Pc of the container 1A is held in alignment with the center Ac of the air cylinder 10, the container 1A does not rotate, but is simply moved forward when it is pushed by the pusher 4. Inasmuch as the silicone tubes 6 are flexible enough, but not repulsive, they absorb shocks when they hit the container 1A. Accordingly, the container 1A is accelerated smoothly when it starts being moved forward by the pusher 4, and hence is less liable to fluctuate in its posture and to fall down.

Some containers 1A have lateral recesses in their barrel as with small-size PET bottles. Because the silicone tubes 6 are vertically arranged, the silicone tubes 6 bear a load in their entirety when the pusher 4 pushes the container 1A, and are capable of easily absorbing shocks when the pusher 4 hits the container 1A.

Figure 6A:
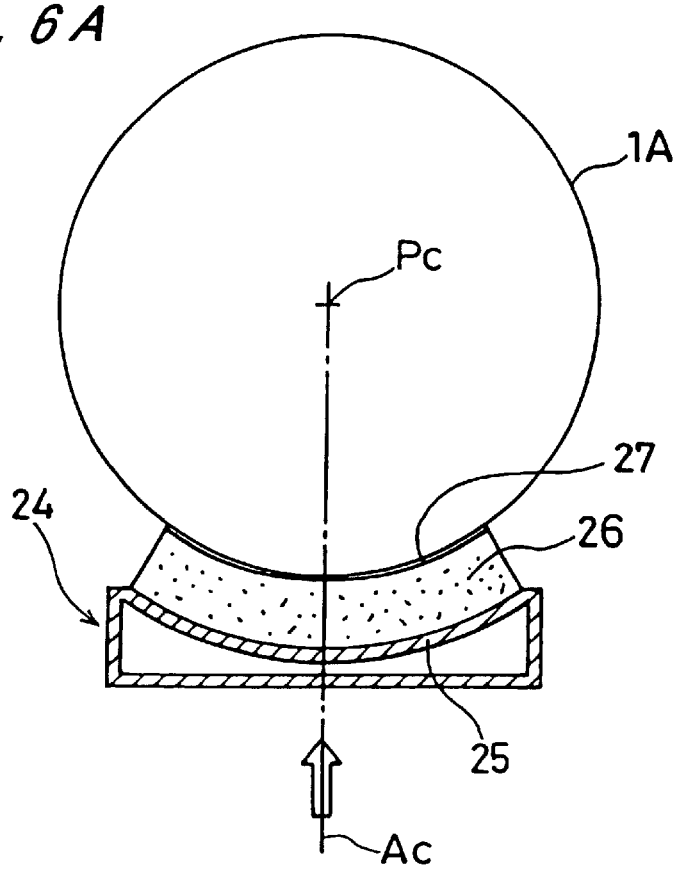
FIG. 6A is a cross-sectional view of a forward end of a pusher according to a comparative example, for use with circular containers.
Figure 6B:
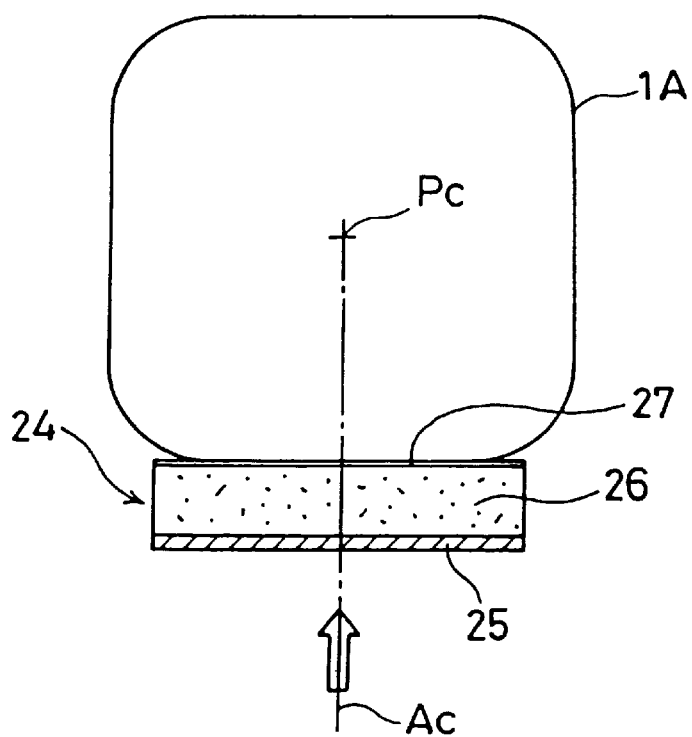
FIG. 6B is a cross-sectional view of a forward end of a pusher according to a comparative example, for use with square containers.

In consideration of the possibility that a sponge layer, for example, on the front face of the pusher may also be effective, the inventors fabricated pushers 24 shown in FIGS. 6A and 6B as comparative examples, and conducted experiments to push the container 1A with the pushers 24 while they are held in alignment with each other in the same manner as the pushers 4 shown in FIGS. 5A and 5B. Each of the pushers 24 shown in FIGS. 6A and 6B comprises a support plate 25, an expanded sponge layer 26 bonded to the support plate 25 by an adhesive, and a fluoroplastic sheet 27 attached to a surface of the expanded sponge layer 26.

The pushers 24 shown in FIGS. 6A and 6B differ from each other in that the pusher 24 shown in FIG. 6A has an arcuate bottle contact face and the pusher 24 shown in FIG. 6B has a flat bottle contact face. When the pushers 24 shown in FIGS. 6A and 6B hit the container 1A, they were able to reduce shocks, but were less effective to absorb shocks, and did not allow the container 1A to start being mover smoothly. Thus, many containers 1A pushed by the pushers 24 fell down. The falling of many containers 1A appears to result from the fact that the expanded sponge layer 26 is not flexible enough and is repulsive.

It has been confirmed from the embodiments of the present invention and the comparative examples that the tubes of synthetic resin on the front face of the pushers shown in FIGS. 5A and 5B are the best for rejecting various containers from the feed conveyor.

Next, a third embodiment of the present invention which relates to an air cylinder and a solenoid valve assembly incorporated in the container rejecting apparatus shown in FIGS. 1A and 1B through 5A and 5B will be described below with reference to FIGS. 8 through 10A and 10B.

FIG. 8 is a side view showing the basic structure of the container rejecting apparatus according to the present invention. As shown in FIG. 8, a plurality of containers 1A are conveyed in an upstanding posture by a feed conveyor 2. A discharge conveyor 3 is disposed adjacent to the feed conveyor 2. Both of the feed conveyor 2 and the discharge conveyor 3 are set to move at approximately the same speed.

The container rejecting apparatus includes a double acting air cylinder 10 mounted on a bracket 46 that is fixed to the frame of the feed conveyor 2, and a solenoid valve assembly 11 for supplying air to or discharging air from the double acting air cylinder 10. A time 14 is connected to a drive section 36 comprising a solenoid of the solenoid valve assembly 11.

At first, a conventional air cylinder and a solenoid valve assembly will be described below in detail.

Figure 9A:
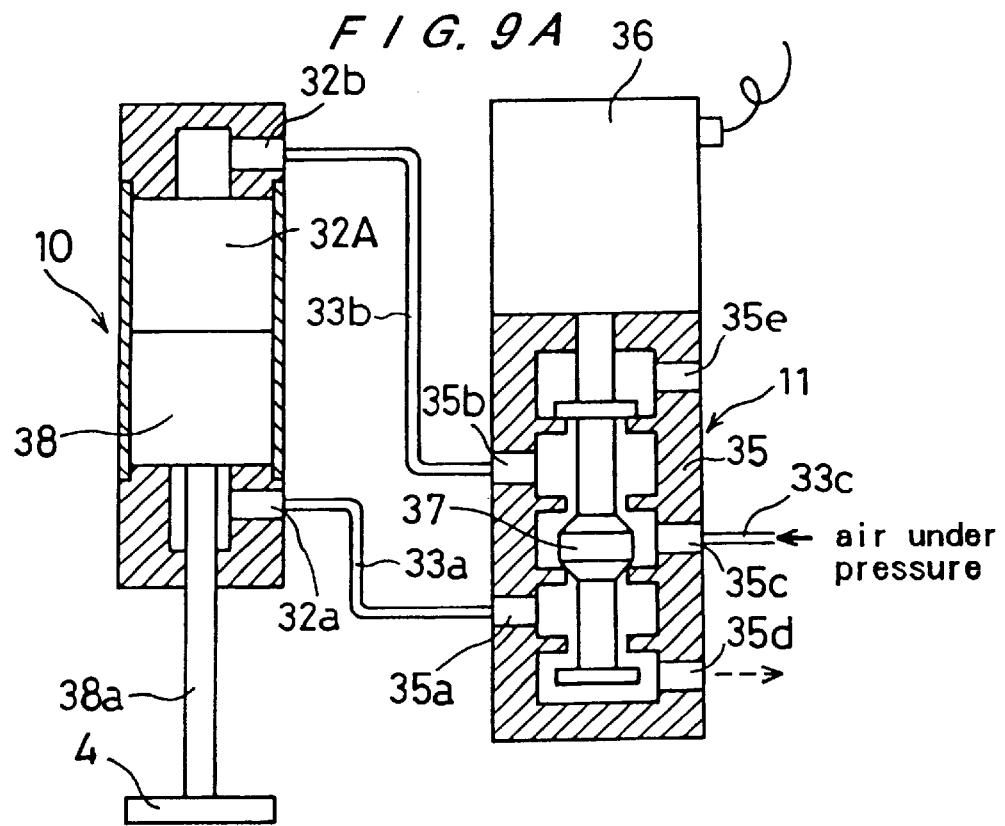
FIGS. 9A and 9B are views showing the structure of a conventional air cylinder and a solenoid valve assembly.
Figure 9B:
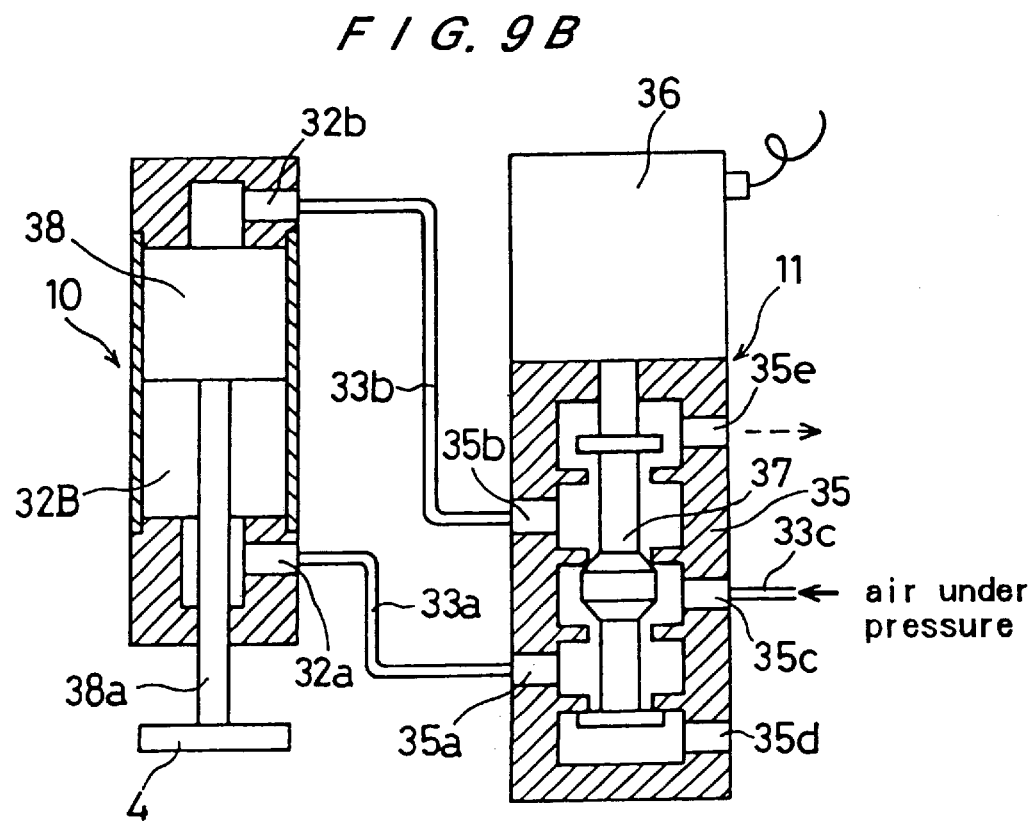

FIGS. 9A and 9B show the structure of the conventional air cylinder and the solenoid valve assembly. As shown in FIGS. 9A and 9B, a double acting air cylinder 10 has front and rear ports 32a and 32b respectively for introducing or exhausting air, a piston 38 that can be moved to an advanced or retracted position by air introduced through the front and rear ports 32a and 32b, and a piston rod 38a connected to the piston 38 and extending outward from the double acting air cylinder 10. A pusher 4 is fixed to the forward end of the piston rod 38a for pushing containers 1A on the feed conveyor 2.

The solenoid valve assembly 11 includes a main valve body 35 having five ports 35a, 35b, 35c, 35d and 35e for introducing or exhausting air, a spool 37 for directing air introduced through the port 35c to either the port 35a or the port 35b, and the drive section 36 for driving the spool 37. The ports 32a and 32b are connected in fluid communication with the ports 35a and 35b by air tubes 33a and 33b, respectively. The central port 35c of the main valve body 35 is connected to a compressed air source (not shown) by an air tube 33c. The remaining two ports 35d and 35e are provided to exhaust air from the air cylinder 10.

According to the above structure, when the drive section 36 is energized in response to a signal for rejecting a container 1A, the spool 37 is moved forward to form a path between the ports 35c and 35b, thereby allowing air under pressure to flow into the space 32A through the rear port 32b. The air introduced into the space 32A pushes the piston 38 toward the advanced position shown in FIG. 9A. At this time, air in the front space 32B is discharged through the ports 32a, 35a and 35d, and the pusher 4 fixed to the forward end of the piston rod 38a is moved forward to push a container 1A from the feed conveyor 2.

When the drive section 36 is de-energized, the spool 37 retracts to form a path between the ports 35c and 35a, thereby introducing air into the space 32B through the front port 32a. At this time, the air in the space 32A is discharged through the=ports 32b, 35b and 35e, and the piston 38 returns to its retracted position shown in FIG. 9B.

However, when the production line is operated at an increasingly higher speed, the piston in the conventional assembly cannot keep up with the line speed. In other words, the piston requires too much time to complete an operation to advance and retract the piston one time. For this reason, extensive studies have been conducted on methods to decrease the amount of time required to retract the piston using the same conventional assembly.

In view of the foregoing, it is an object of the third embodiment of the present invention to provide a container rejecting apparatus which has an air cylinder system driven by one solenoid valve assembly and is capable of coping with a high-speed production line.

Next, an air cylinder and a solenoid valve assembly according the present invention will be described below in detail.

Figure 10A:
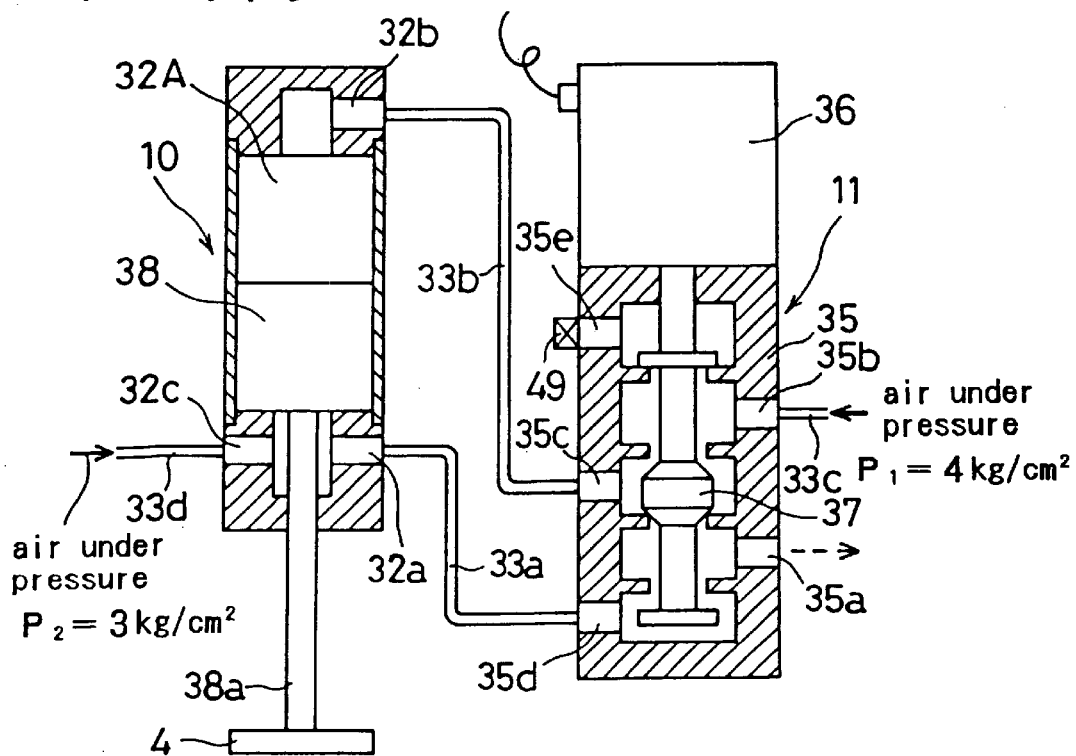
FIGS. 10A and 10B are views showing the structure of an air cylinder and a solenoid valve assembly according to the third embodiment of the present invention.
Figure 10B:
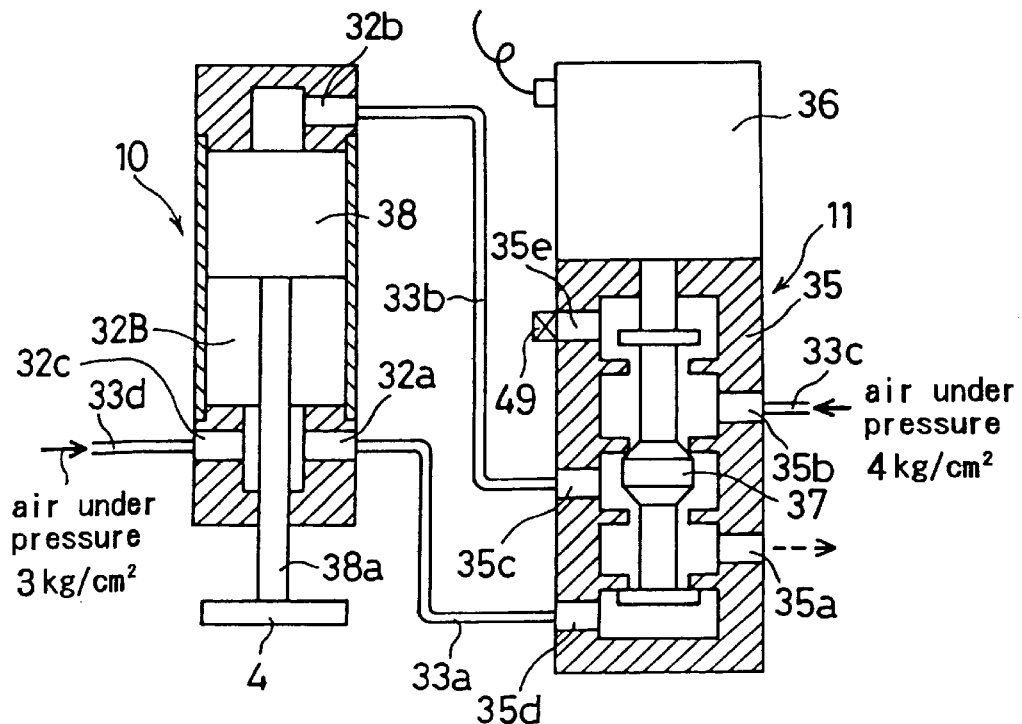

FIGS. 10A and 10B show the structure of the air cylinder and the solenoid valve assembly. As in the conventional assembly, the double acting air cylinder 10 shown in FIGS. 10A and 10B has front and rear ports 32a and 32b respectively, a piston 38 that can be moved to an advanced or retracted position, and a piston rod 38a connected to the piston 38 and extending outward from the double acting air cylinder 10. A pusher 4 is fixed to the forward end of the piston rod 38a for pushing the containers 1A (see FIG. 8). The solenoid valve assembly 11 includes a main valve body 35 having five ports 35a, 35b, 35c, 35d and 35e, a spool 37, and a drive section 36 comprising a solenoid.

However, unlike the conventional air cylinder and solenoid valve assembly, the front and rear ports 32a and 32b of the double acting air cylinder 10 are connected to the ports 35d and 35c of the solenoid valve assembly 11, respectively through air tubes 33a and 33b. The port 35b of the solenoid valve assembly 11 is connected to a compressed air source (not shown) through an air tube 33c. Air having a pressure $P_1$ of 4 kg/cm$^2$ is supplied from this air source to the port 35b. The port 35a serves as an outlet port for exhausting air, and the port 35e is sealed with a plug 49.

The double acting air cylinder 10 is further provided with a port 32c. The port 32c is connected to a compressed air source (not shown) through an air tube 33d. Air having a pressure $P_2$ of 3 kg/cm² is constantly and continuously supplied to the space 32B of the double acting air cylinder 10 through the air tube 33d and the port 32c. Further, the port 32c is connected to a port 32a in fluid communication.

As can be understood from the above description, the present invention differs from the conventional assembly in that the double acting air cylinder 10 is provided with an additional port 32c through which air having a pressure $P_2$ is supplied to the space 32B, and this air of a pressure $P_2$ is supplied to the space 32B to return the piston 38 to its retracted position and does not pass through the solenoid valve assembly 11. Although the solenoid valve assembly 11 is of a general-purpose type that is well known in the art, the five ports 35a–35e have different functions. That is, the solenoid valve assembly 11 includes one port connected to a compressed air source (port 35b), one exhaust port (port 35a), and two ports connected to the air cylinder (ports 35c and 35d).

Next, the operations of the container rejecting apparatus shown in FIGS. 8, and 10A and 10B will be described.

A signal to reject a container actuates the drive section 36 of the solenoid valve assembly 11 to move the spool 37 forward. When the spool 37 is moved forward, a path between the ports 35b and 35c is formed to allow air of a pressure $P_1$ to be introduced into the space 32A through the rear port 32b. At this time, air of the pressure $P_2$ is still being supplied to the space 32B. However, when the spool 37 is moved, another path is formed between the ports 35d and 35a to allow air to be exhausted from the space 32B. This exhaustion decreases the pressure supplied to the space 32B for returning the piston 38 to its advanced position. Thus, the decrease in pressure in the space 32B combined with the increase of pressure in the space 32A pushes the piston 38 forward to the position shown in FIG. 10A. As the piston 38 is moved forward, the pusher 4 pushes the container, 1A from the feed conveyor 2 onto the discharge conveyor 3 (see FIG. 8).

The timer 14 is set to the time required for the piston 38 to perform this operation. When the time set by the timer 14 elapses, the electric current supplied to the drive section 36 is shut off. As a result, the spool 37 is retracted to its original position shown in FIG. 10B, thus forming a path between the ports 35c and 35a and closing the path between the ports 35d and 35a. Thus, the exhaust outlet from the space 32B is closed to allow pressure to build up in the space 32B. On the other hand, air in the space 32A is exhausted through the ports 32b, 35c and 35a. Consequently, the piston 38 is returned immediately to its retracted position.

As described above, by supplying constant pressure to push the piston to its retracted position from a separate source, it is possible to increase the pressure toward the retracted position more quickly than when supplying pressurized air for the same purpose via the solenoid valve assembly. Accordingly, the time required to return the piston to its retracted position can be decreased, thus enabling the piston to keep up with a high-speed line more easily. Further, an apparatus according to the present invention can be manufactured using a conventional solenoid valve assembly. Even if a new solenoid valve assembly is used, only one valve assembly is required for the present invention, and hence it is possible to manufacture a compact apparatus.

Although certain preferred embodiments of the present invention have been shown and described in detail, it should be understood that various changes and modifications may be made therein without departing from the scope of the appended claims.

What is claimed is:

1. A container rejecting apparatus for rejecting a container filled with a liquid from a feed conveyor to a discharge conveyor adjacent thereto, comprising:
   a pusher configured to be moved to push the container from the feed conveyor onto the discharge conveyor, said pusher having a front face comprising a plurality of tubes of synthetic resin.

2. A container rejecting apparatus according to claim 1, wherein the feed conveyor has a surface on which the container is to be put, and wherein said tubes are arranged vertically with respect to the surface.

3. A container rejecting apparatus according to claim 1, wherein said pusher includes a tape fastener, said front face being detachable by said tape fastener.

4. A container rejecting apparatus according to claim 1, wherein
   said pusher being positioned to impart an angular movement in conjunction with the feed conveyor to the bottle when pushing the bottle.

5. A container rejecting apparatus for rejecting a container comprising:
   a feed conveyor configured to convey the container;
   a discharging conveyor configured to receive the container rejected off said feed conveyor;
   a pusher configured to move straight and push the container off the feed conveyor onto the discharge conveyor; and
   timing means for timing said feed conveyor and said pusher such that the container is pushed by the pusher off-centered to impart rotation on the container.

6. A container rejecting apparatus according to claim 5, wherein said pusher has a front face comprising an elastically deformable synthetic resin member.

7. A container rejecting apparatus according to claim 6, wherein said elastically deformable synthetic resin member comprises a plurality of tubes.

8. A container rejecting apparatus according to claim 5, further comprising a guard rail disposed over said discharge conveyor, said guard rail comprising a shock-absorbing member and a sheet of synthetic resin mounted on said shock-absorbing member.

* * * * *